US006906773B2

(12) United States Patent
Choi

(10) Patent No.: US 6,906,773 B2
(45) Date of Patent: Jun. 14, 2005

(54) LIQUID CRYSTAL DISPLAY DEVICE

(75) Inventor: Joung Su Choi, Gyeongsangbook-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 97 days.

(21) Appl. No.: 10/422,762

(22) Filed: Apr. 25, 2003

(65) Prior Publication Data

US 2004/0125314 A1 Jul. 1, 2004

(30) Foreign Application Priority Data

Dec. 31, 2002 (KR) .................................. 10-2002-0088359

(51) Int. Cl.[7] .............................................. G02F 1/13
(52) U.S. Cl. ...................................................... 349/153
(58) Field of Search .......................................... 349/153

(56) References Cited

U.S. PATENT DOCUMENTS 6,476,895 B1    11/2002   Kwak et al. ................. 349/123
2001/0013918 A1 *  8/2001   Kwak et al. ................. 349/153

* cited by examiner

Primary Examiner—James A. Dudek
(74) Attorney, Agent, or Firm—Morgan Lewis & Bockius LLP

(57) ABSTRACT

A liquid crystal display device includes a substrate having an image display part; a metal line on the substrate; an insulating film on the metal line; a passivation film on the insulating film; a semiconductor layer for increasing the adhesive bond between the insulating film and the passivation film; and a sealant pattern of sealant having a path formed along the periphery of the image display part, wherein the insulating film and the passivation layer have a plurality of holes along the path of the sealant pattern.

19 Claims, 12 Drawing Sheets

LIQUID CRYSTAL DISPLAY DEVICE

This application claims the benefit of the Korean Application No. 2002-88359 filed on Dec. 31, 2002, which is hereby incorporated by reference in its entirety.

BACKGROUND OF THE INVENTION

1. Field of the Invention

The present invention relates to a liquid crystal display (LCD) device, and more particularly, to an LCD device in which an adhesive force between an upper substrate and a lower substrate is enhanced.

2. Description of the Related Art

Generally, a liquid crystal panel of the LCD includes a lower substrate on which thin film transistors are arranged and an upper substrate on which a color filter is formed. Between the upper substrate and the lower substrate, a liquid crystal is positioned. A common electrode is formed on an inner surface of the upper substrate facing the lower substrate. Pixel electrodes are formed on an inner surface of the lower substrate facing the upper substrate. Thus, the common electrode and the pixel electrodes are arranged to face with each other. The liquid crystal is interposed into a space between the upper and lower substrates through an injection opening of a seal about the periphery of the upper and lower substrates. The injection opening is sealed after the liquid crystal is interposed between the upper and lower substrates. Subsequently, polarizing plates are attached to outer surfaces of the upper substrate and the lower substrate to complete the LCD device.

The light transmission of each LCD device in a liquid crystal display panel is controlled by applying voltages to each of the pixel electrodes with respect to the common electrode such that characters/images are displayed on the liquid crystal display panel via an optical shutter effect in each of the LCD devices.

FIG. 1 is a plan view schematically showing a structure of the related art liquid crystal display panel. As shown in FIG. 1, the related art liquid crystal display panel 2 has a lower substrate 4 and an upper substrate 6 configured to be in parallel and face each other. Between the lower substrate 4 and the upper substrate 6 of the related art liquid crystal display panel 2, an image display part 8 has liquid crystal cells arranged in a matrix configuration. A gate pad 12 and a data pad 14 are connected between driving ICs (not shown) and the image display part 8. A gate link 34 and a data link 16 connect the gate pad 12 and the data pad 14 to the image display part 8, respectively. A seal pattern 10 is formed on an outer periphery of the image display part 8 such that the lower substrate 4 is adhered to the upper substrate 6.

In the image display part 8, a plurality of data lines 13 through which video signals are applied via the data pad 14 and the data link 16, and a plurality of gate lines 11 through which gate signals are applied via the gate pad 12 and the gate link 34 are arranged on the lower substrate 4 such that the data lines and gate lines cross over each other. Each of the liquid crystal cells is positioned adjacent to where data line and gate line cross over each other. In addition, each of the liquid crystal cells has a Thin Film Transistor ("TFT") for switching a data signal to a pixel electrode connected to the TFT so as to drive the liquid crystal cell.

The upper substrate 6 includes red (R), green (G) and blue (B) color filters formed in separate liquid crystal cells that are separated by a black matrix. A transparent conductive electrode is formed on the surface of the color filters as a common electrode. The upper substrate 6 and the lower substrate 4 are spaced apart from each other by a spacer to maintain a cell gap of a predetermined interval. This cell gap together with the seal pattern 10 defines the region into which the liquid crystal is injected after the upper substrate 6 and the lower substrate 4 are adhered to each other. The upper substrate 6 and the lower substrate 4 are attached to each other by a sealant that is coated on as a seal pattern 10 on the outer periphery of the image display part 8. Liquid crystal is injected in between the upper substrate 6 and the lower substrate 4 through an injection opening, and the injection hole is sealed.

The gate pad 12 and the data pad 14 are formed along a periphery of the lower substrate 4 that is not overlapped by the upper substrate 6. The gate pad 12 supplies the gate lines 11 of the image display part 8 via the gate link 34 with a scan signal provided from the gate drive IC (not shown) through interconnection lines of a tape carrier package (TCP) film (not shown). Also, the data pad 14 supplies the data lines 13 of the image display part 8 via the data link 16 with a video data signal provided from a data drive IC (not shown).

In the liquid crystal display panel 2 of FIG. 1, a passivation film for protecting metal electrode lines and thin film transistors on the lower substrate 4 from the liquid crystal is coated on the entire upper surface of the lower substrate 4 facing the upper substrate 6. Pixel electrodes are connected to the thin film transistors of the liquid cells through contact holes formed in the passivation film of every liquid crystal cell. The pixel electrode is a transparent conductive electrode, such as Indium Tin Oxide ("ITO"), and has a comparatively strong endurance property against the liquid crystal material.

An inorganic insulating film such as $SiN_x$ or $SiO_x$ is typically used as a passivation film. However, an inorganic passivation film has of high dielectric constant. Accordingly, a coupling effect can occur due to a parasitic capacitance formed between the pixel electrode and the data lines 13 with the inorganic passivation film therebetween. Hence, when an inorganic passivation film is used, the pixel electrode and the data lines 13 are spaced far apart from each other by a comparatively long distance of 3~5 $\mu$m so that they do not to overlap with each other and to minimize such a coupling effect. Thus, the area of the pixel electrode, which applies voltage to the liquid crystal layer, has to be made smaller, which adversely affects the aperture ratio of the liquid cell in that less of the overall area of the liquid crystal cell is used.

To overcome this adverse affect to the aperture ratio, an organic material that has a comparatively low dielectric constant, such as Benzocyclobutene (BCB), Spin on glass (SOG), Acryl or the like, is used as the passivation film. Since such an organic material has a low dielectric constant of about 2.7, a pixel electrode can be overlapped with a data line to some degree. Accordingly, the aperture ratio of the liquid crystal cell can be improved corresponding to the increase in the area of the pixel electrode as result of overlapping a pixel electrode with a data line.

In an LCD having a high aperture ratio and provided with an organic passivation film, the sealant coated as the seal pattern 10 contacts the organic passivation film of the lower substrate 4 when attaching the upper substrate 6 and the lower substrate 4 to each other. However, the sealant is mainly made of an epoxy resin or the like having a weak adhesive bonding characteristic to the organic passivation film while it has a strong adhesive bonding characteristic to glass and an inorganic passivation film. Thus, in a liquid crystal display having a high aperture ratio provided with an organic passivation film, liquid crystal may leak from a seal pattern 10 that has a weak adhesive force between the sealant and the organic passivation film when the liquid crystal display panel is impacted or subjected to other kinds of increased pressure. In addition, the organic passivation film has a bad adhesive bonding characteristic to the gate insulating film formed below the organic passivation film. Thus, even a slight amount of pressure may easily create a break between the organic passivation film and the gate insulating film very easily, so that the organic passivation film is delaminated or the liquid crystal leaks.

FIG. 2 is a magnified plan view of the cross portion between the data link and the seal pattern of the related art LCD shown in FIG. 1. As shown in FIG. 2, the data link 16 is formed together with the data pad 14 and the data line 13 in the image display part. Below the data link 16, the semiconductor layer 18 is formed extending from the data line 13 to the data pad 14. The semiconductor layer 18 is formed below the data link 16 in a fabrication method using four (4) masks. The semiconductor layer 18 may not be formed below the data link 16 in a fabrication method using five (5) masks. Also, FIG. 2 illustrates that the seal pattern 10 of sealant is formed to cross the data link 16 on the organic passivation film at a crook in the data link 16.

The data pad 14 is contacted to a transparent electrode 17 on the organic passivation film through a contact hole 19 formed in the organic passivation film. Here, the transparent electrode 17 connected to a data drive IC mounted on a TCP film functions to protect a metal electrode that is a data pad 14 and also prevents the metal electrode from being oxidized when repeating an adhering process of the TCP film that is required in a TAB procedure.

FIG. 3A is a vertical sectional view of a liquid crystal panel taken along the line I–I' of FIG. 2, and FIG. 3B is a vertical sectional view of a liquid crystal panel taken along the line II–II' of FIG. 2. Referring to FIGS. 3A and 3B, the lower substrate 4 is constructed to include a gate insulating film 22, a semiconductor layer 18 and a data link 16 that are stacked in this named order on a glass substrate 20. Organic passivation film 24 is formed to cover the entire surface of the gate insulating film 22 including the semiconductor layer 18 and the data link 16.

The upper substrate 6 is configured to include a color filter, a black matrix 28 and a transparent common electrode 26 that are formed in this named order on the rear surface of an upper glass substrate 30 facing the lower substrate 20. The transparent common electrode 26 is formed on the entire rear surface of the upper glass substrate 30. The lower substrate 4 and the upper substrate 6 are attached to each other by the sealant coated as the seal pattern 10.

In this case, the sealant of the seal pattern 10 is adhered to the organic passivation film 24 and has a weak adhesive bonding force. In addition, the organic passivation film 24 very weakly adheres to the gate insulating film 22 that is made of inorganic material and formed below the organic passivation film 24. Thus, a crack may be created by an external impact such that the organic passivation film 24 may delaminate or the liquid crystal will leak out. As shown in FIG. 3B, the region inside the seal pattern 10 is in the image display part 8 where the liquid crystal 32 is injected.

FIG. 4 a magnified plan view of a portion of a gate link crossing the seal pattern shown in FIG. 1. As shown in FIG. 4, the gate link 34 is formed together with the gate pad 12 and the gate line 11 of an image display part. The gate pad 12 is connected to the transparent electrode 17 through the contact hole 19 formed in the gate insulating film and the overlying organic passivation film. Also, FIG. 4 illustrates that the seal pattern 10 of sealant is formed to cross the gate link 34 on the organic passivation film at a crook in the gate link 34.

FIG. 5A is a vertical sectional view of a liquid crystal panel taken along the line III–III' of FIG. 4, and FIG. 5B is a vertical sectional view of a liquid crystal panel taken along the line IV–IV' of FIG. 4. Referring to FIGS. 5A and 5B, a lower substrate 4 is configured to include a gate link 34, a gate insulating film 22, and an organic passivation film 24 that are stacked in this named order on a glass substrate 20. The organic passivation film 24 is formed to cover the entire surface of the glass substrate 20 including the gate insulating film 22.

Like in the case of the data link above, the sealant of the seal pattern 10 adheres to the organic passivation film 24 with a weak adhesive bonding force. Further, in the area on which the seal pattern 10 is formed other than adjacent to the data pad 14 and the gate pad 12, the sealant of the seal pattern 10 is also adhered to the organic passivation film 24 with a weak adhesive bonding force. As an overall result, a liquid crystal display panel having a high aperture ratio using an organic passivation film has a weak adhesive bonding force between the sealant and the organic passivation film as well as between the organic passivation film and the gate insulating film that may result in a liquid crystal leak.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device in which the adhesive force between the seal pattern and the lower substrate is enhanced.

Another object of the present invention is to increase the bonding force between a passivation film and an insulating film in a liquid crystal display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a substrate having an image display part; a metal line on the substrate; an insulating film on the metal line; a passivation film on the insulating film; a semiconductor layer for increasing the adhesive bond between the insulating film and the passivation film; and a sealant pattern of sealant having a path formed along the periphery of the image display part, wherein the insulating film and the passivation layer have a plurality of holes along the path of the sealant pattern.

In another aspect, a liquid crystal display device includes a substrate having an image display part; a metal line on the substrate; an insulating film on the metal line; a passivation film on the insulating film; a sealant pattern of sealant having a path formed along the periphery of the image display part, wherein the insulating film and the passivation layer have a plurality of holes along the path of the sealant pattern; and semiconductor layers for increasing the adhesive bond between the sealant and the substrate.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings.

Figure 1:
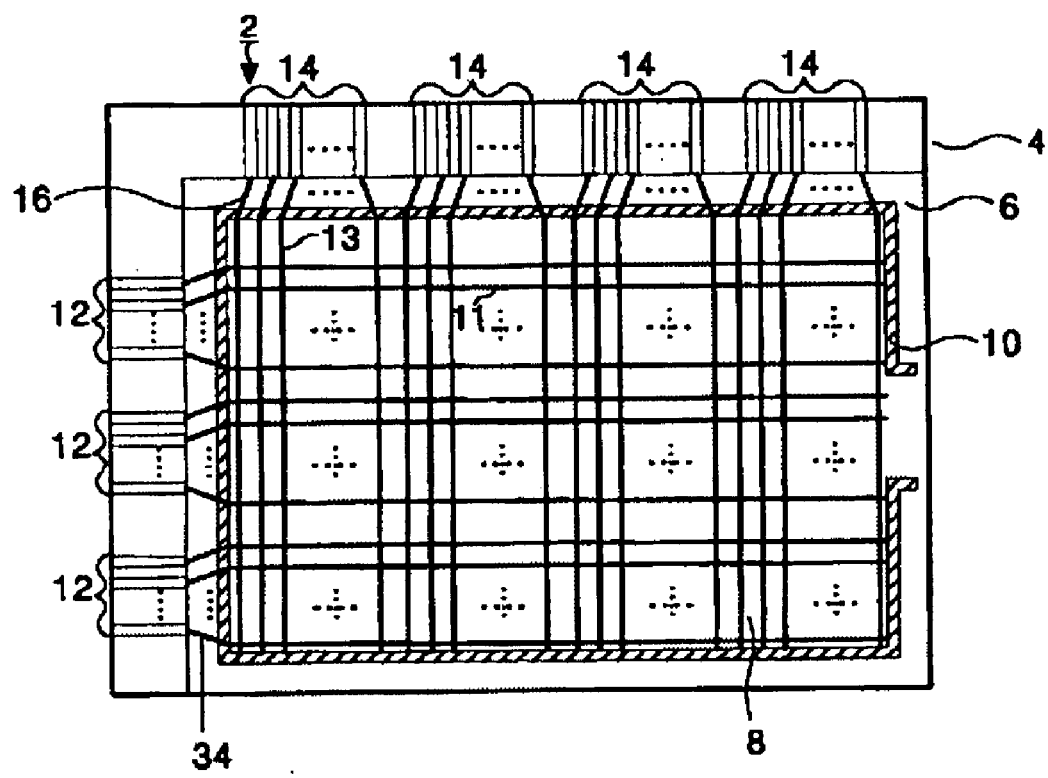
FIG. 1 is a plan view schematically showing a structure of the related art liquid crystal display panel.
Figure 2:
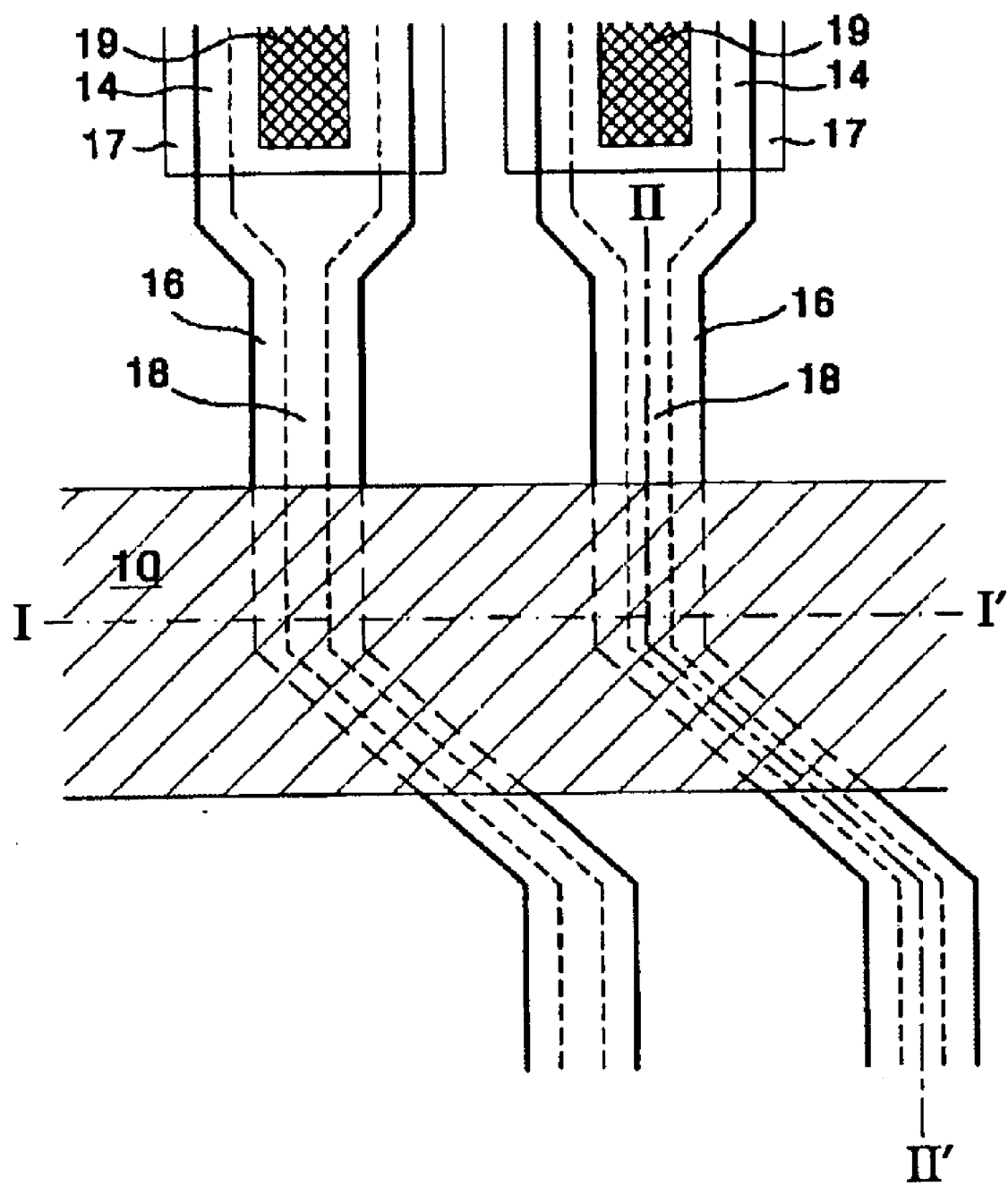
FIG. 2 is a magnified plan view of a seal pattern shown in FIG. 1 crossing data links.
Figure 3A:
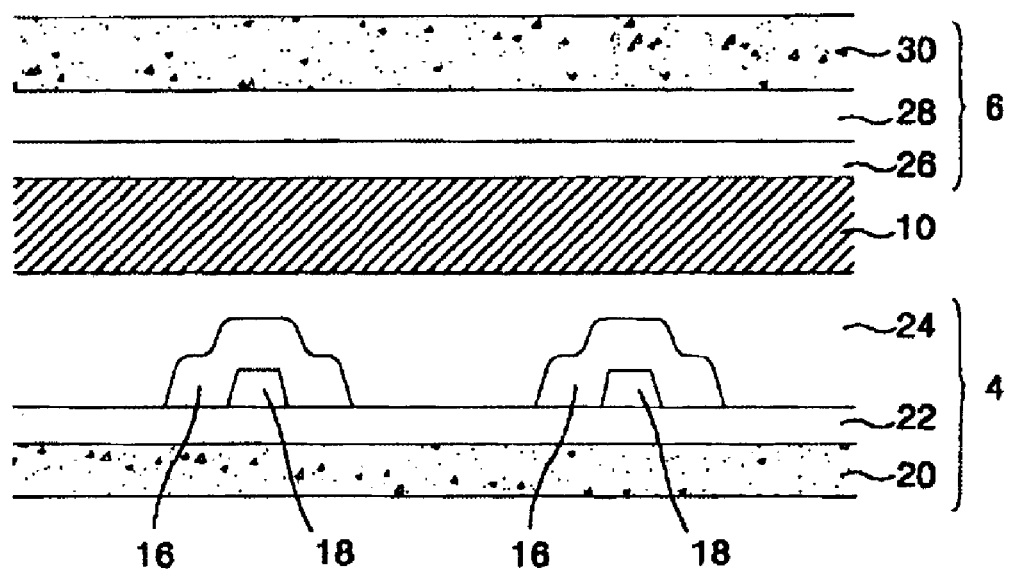
FIG. 3A is a vertical sectional view of a liquid crystal display panel taken along the line I–I' of FIG. 2.
Figure 3B:
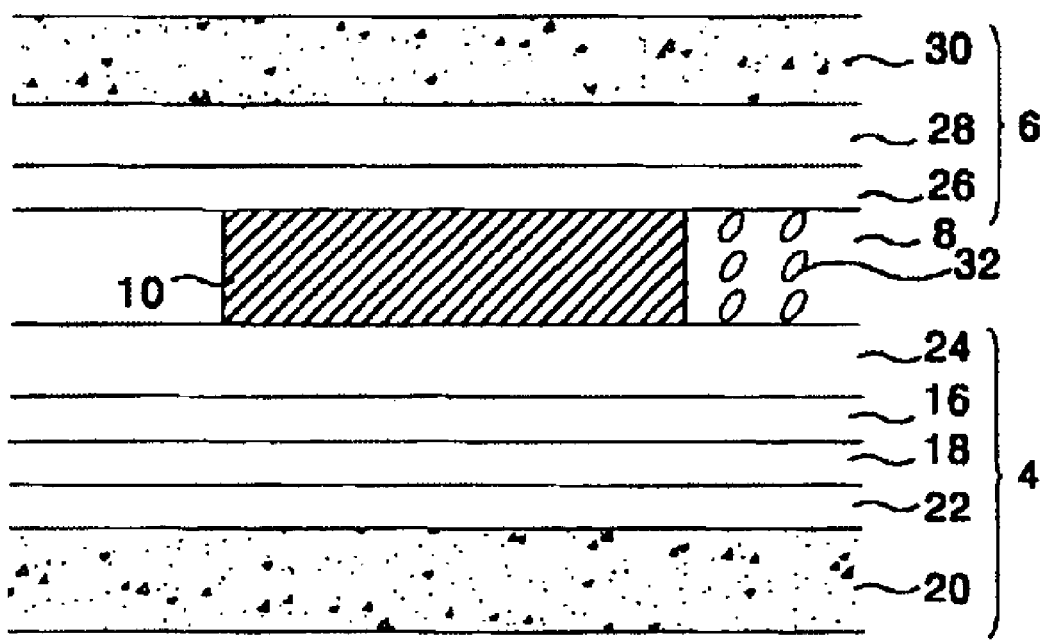
FIG. 3B is a vertical sectional view of a liquid crystal display panel taken along the line II–II' of FIG. 2.
Figure 4:
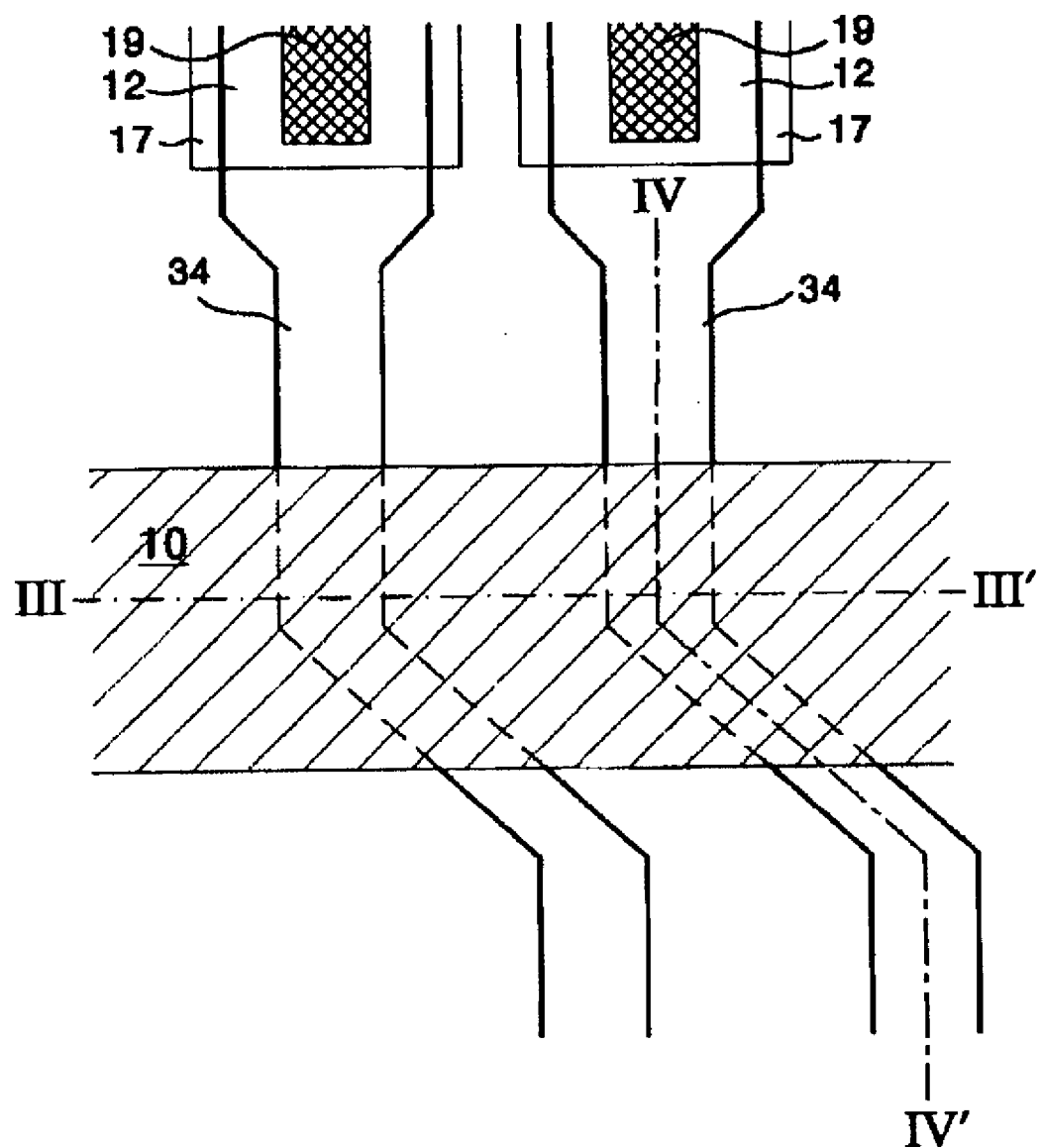
FIG. 4 is a magnified plan view of a seal pattern shown in FIG. 1 crossing gate links.
Figure 5A:
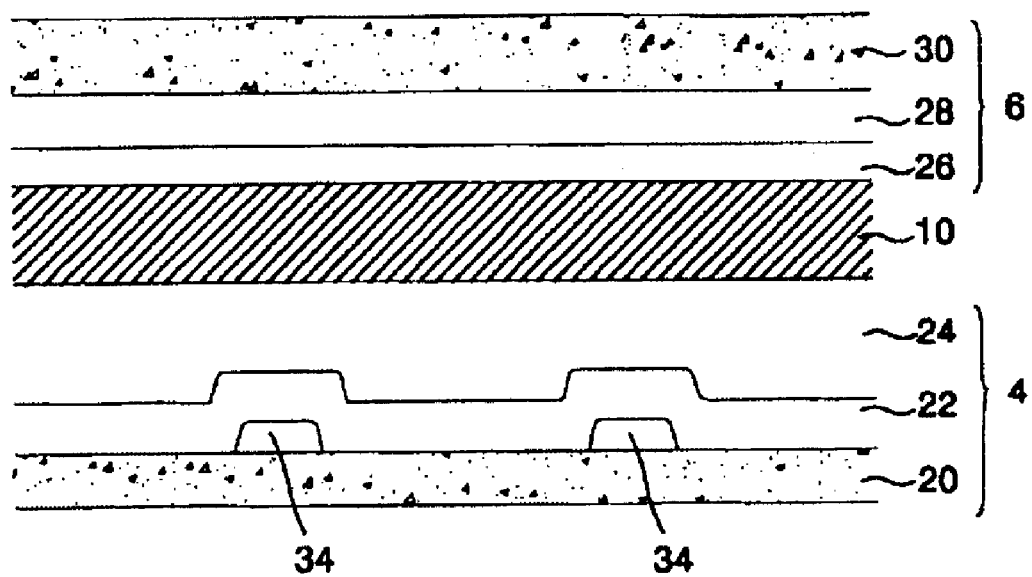
FIG. 5A is a vertical sectional view of a liquid crystal display panel taken along the line III–III' of FIG. 4.
Figure 5B:
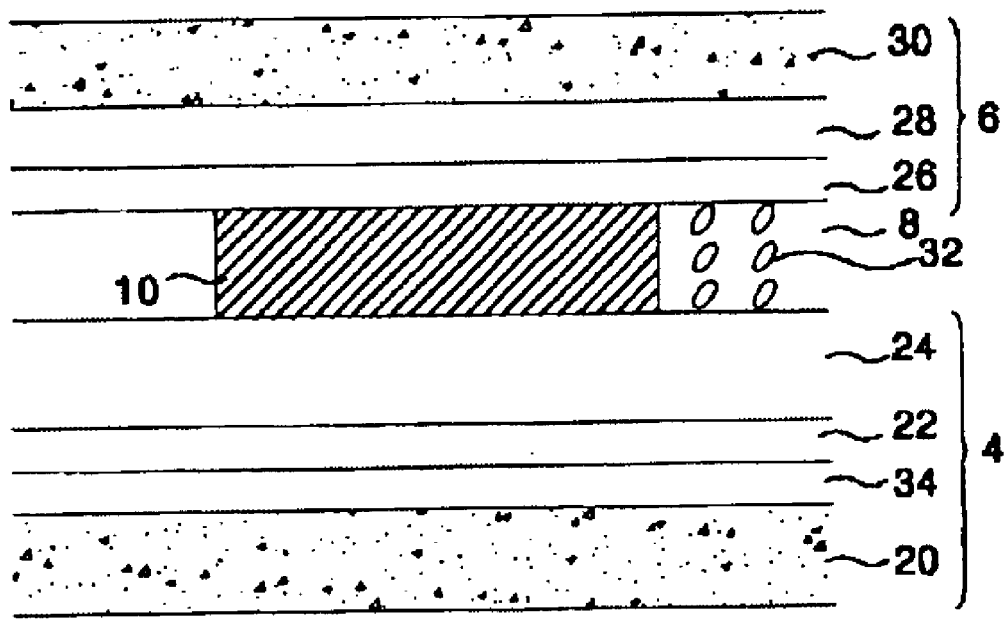
FIG. 5B is a vertical sectional view of a liquid crystal display panel taken along the line IV–IV' of FIG. 4.
Figure 6:
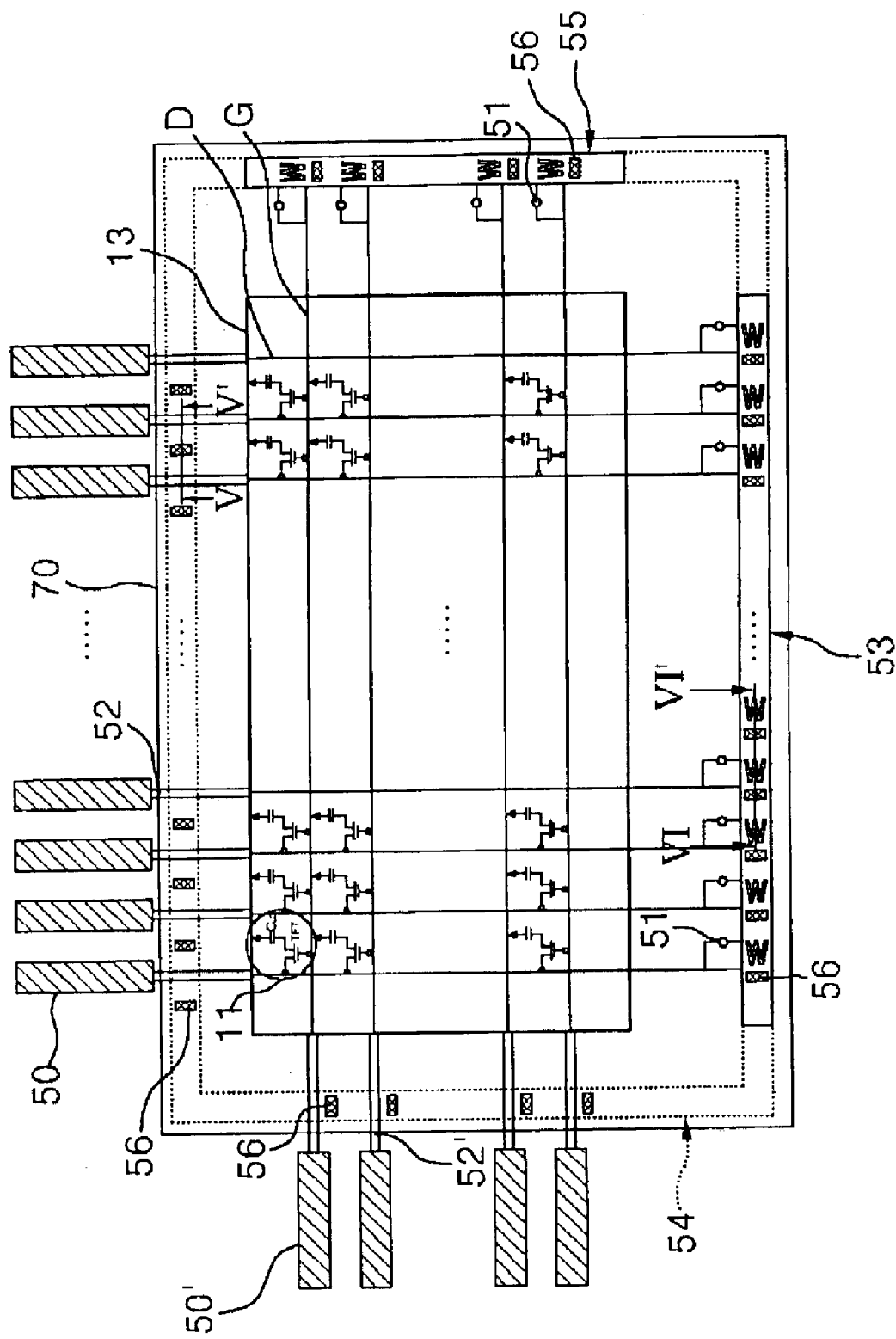
FIG. 6 is a schematic plan view of the lower substrate of an LCD according to an exemplary embodiment of the present invention.

FIG. 6 is a schematic plan view of a lower substrate of an LCD panel according to an exemplary embodiment of the present invention. More specifically, FIG. 6 shows a seal pattern 54 on a lower substrate 70 for adhering an upper substrate to the lower substrate 70 using a sealant. The lower substrate 70 includes an image display part 13 having liquid crystal cells 11 arranged in matrix configuration. The lower substrate 70 also includes data pads 50 and gate pads 50' that are respectively connected to data links 52 and gate links 52'. The data pads 50 and the gate pads 50' are for connecting the image display part 13 to driver ICs (not shown). In addition, a dummy line 55 is formed on the side of the image display part 13 opposite to the side of the image display part 13 on which the gate pads 50' are positioned, and a common line 53 is formed on the side of the image display part 13 opposite to the side of the image display part 13 on which the data pads 50 are positioned. Further, static electricity prevention circuits 51 are connected between the dummy line 55 and gate lines G, and between the common line 53 and data lines D. Each of the static electricity prevention circuits 51 includes a plurality of thin film transistors. The plurality of thin film transistors has low impedance at high voltages to discharge excess current caused by static electricity. The plurality of thin film transistors also has high impedance at normal drive voltages of the signal lines such that normal drive signals are not affected.

The seal pattern 54 according to the present invention is formed across the gate links 52' connected between the gate lines G and the gate pads 50', across the data links 52 connected between the data lines D and the data pads 50, across the common line 53 and across the dummy line 55. In other words, the sealant pattern 54 has a path formed along the periphery of the image display part 13. In addition, the seal pattern 54 fills holes 56 that are formed at predetermined intervals in regions of the lower substrate 70 and along the path of the sealant pattern 54. As shown in FIG. 6, the predetermined intervals can be in between the data links 52', gate links 52, the data lines D and the signals lines G.

Figure 7:
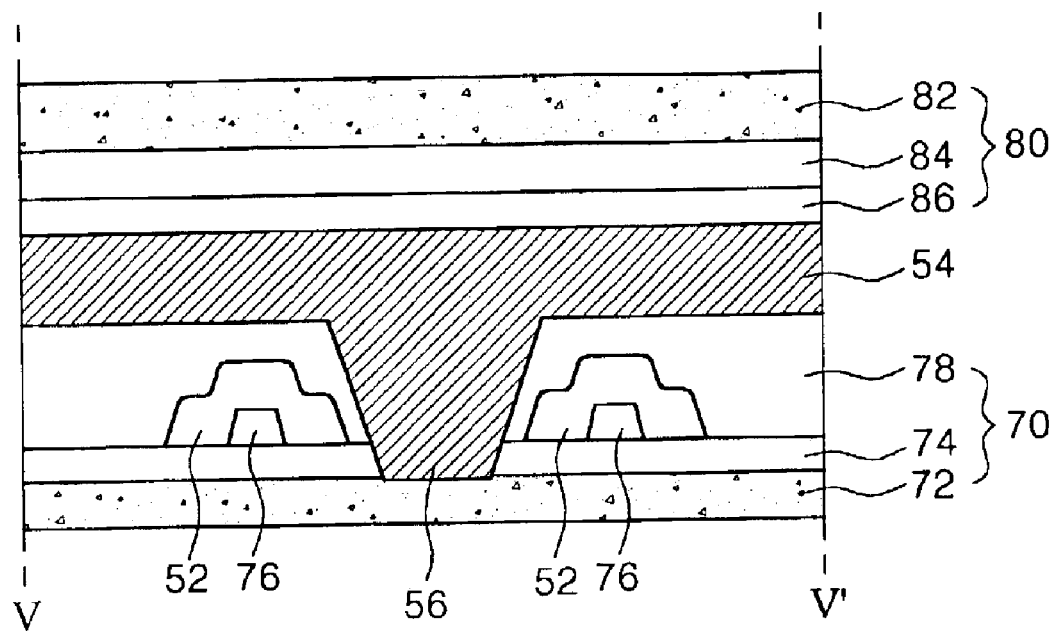
FIG. 7 is a cross-sectional view of the liquid crystal display panel including a specific area along V–V' in FIG. 6.

FIG. 7 is a sectional view of the liquid crystal display panel including a specific area along V–V' in FIG. 6. More specifically, FIG. 7 is a sectional view of the seal pattern 54 crossing data links 52 connected between data lines D and the data pads 50. The structure of the seal pattern 54 crossing the data links 50 is similar to the structure of the seal pattern 54 crossing the gate links 52'. This structure includes a gate insulating film 74, a semiconductor layer 76 and a data links 52 stacked on a glass substrate 72 of the lower substrate. The structure of FIG. 7 also includes an organic passivation film 78 coated on the entire surface of the lower glass substrate 72 including the data links 52 and gate insulating film 74. While the semiconductor layer 76 is formed below the data links 52 in a fabrication method using four (4) masks, it may not be formed below the data links 52 in a fabrication method using five (5) masks.

As shown in the structure of FIG. 7, holes 56 are formed between the data links 52. In other words, the organic passivation film 78 and the gate insulating film 74 are etched to form holes 56 in between the adjacent data links 52 (and the gate links 52'). The holes 56 are formed with a predetermined pattern by exposure, development and etching processes using a photoresist and an exposure mask.

As further shown in the structure of FIG. 7, a color filter and a black matrix collectively referred to as 84, are formed on the rear surface of an upper glass substrate 82 of an upper substrate 80. A transparent common electrode 86 is formed on the entire surface including the color filter and the black matrix 84. The lower substrate 70 and the upper substrate 80 are attached to each other by a sealant coated as a seal pattern 54. The sealant of the seal pattern 54 is in direct contact with the lower glass substrate 72 through the holes 56 formed on the lower substrate at predetermined intervals.

The sealant is made of epoxy resin or the like having a strong adhesive bonding force to the inorganic glass substrate 72. The adhesive bond between the upper substrate 80 and the lower substrate 70 is improved since the sealant pattern is bonded to both organic passivation film 78 and the inorganic glass substrate 72. Further, the contact area of the sealant in the sealant pattern 54 to the lower substrate 70 is enlarged by the holes, which further improves the adhesive bonding capability of the sealant pattern 54.

Figure 8A:
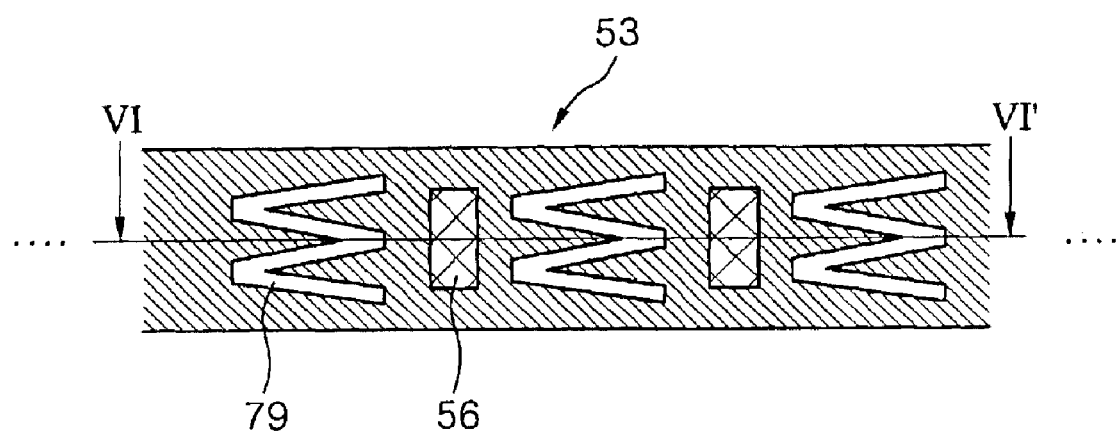
FIG. 8A is a magnified plan view of a specific area VI–VI' of FIG. 6.
Figure 8B:
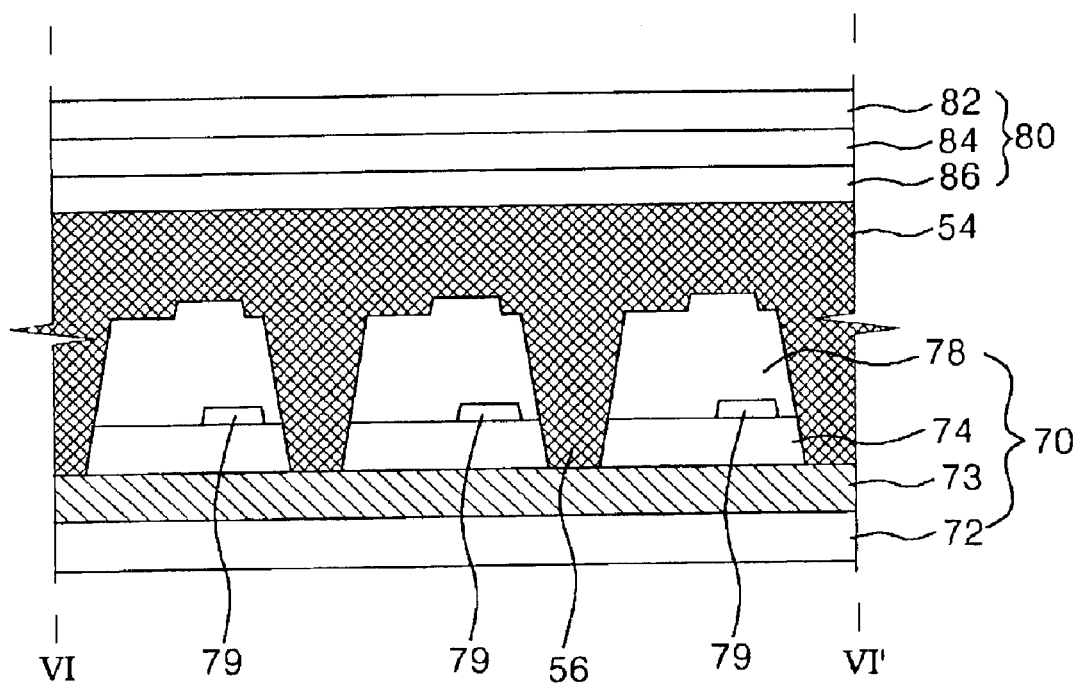
FIG. 8B is a sectional view of a liquid crystal display device including a specific area along VI–VI' in FIG. 6.

FIG. 8A is a magnified plan view of a specific area including VI–VI' of FIG. 6. FIG. 8B is a cross-sectional view of a liquid crystal display panel including a specific area along VI–VI' of FIG. 6. More particularly, FIGS. 8A and 8B show an area on the common line 53 formed on the periphery of the image display part 13 at a side of the lower substrate opposite to the side of the lower substrate having the data pads. As shown in FIG. 8A, a semiconductor layer 79 having a specific shape is formed on the common line 53. The common line 53 can be made of a material that is the same as the gate lines G. A gate insulating film, a semiconductor layer and a protection layer can be formed on the common line 53.

The semiconductor layer 79 is laminated when making the lower substrate with 4 masks. The semiconductor layer 79 does not have to be laminated when making the lower substrate with 5 masks. However, the semiconductor layer 79 should preferably be formed such that the semiconductor layer 79 is formed with a predetermined shape to improve the bonding of the organic passivation film 78 to the gate insulating film 74. In FIG. 8A, the semiconductor layer 79 is formed and patterned in the shape of a "W" but it is not limited to the "W" shape. The reason why the semiconductor layer 79 is formed in a shape on the common line 53 is that the shape of the semiconductor layer 79 on the common line 53 enlarges the area for bonding the organic passivation film 78 to the gate insulating film 74 and thus improves bonding of organic passivation film 78 to the gate insulating film 74.

FIG. 8B is a cross-sectional view of the seal pattern crossing over the common line 53. The structure of the seal pattern 54 crossing the common line 53 can be similar to the structure of the seal pattern 54 crossing the dummy line 55. The structure includes a metal line 73 that is the common line 53, the gate insulating film 74 and the semiconductor layer 79 laminated on the glass substrate 72 of the lower substrate. In the case of the dummy line 55, the metal line 73 is the dummy line 55. The structure also includes an organic passivation film 78 coated entirely over the metal line 73, gate insulating film 74 and semiconductor layer 79. Here, the semiconductor layer 79 is formed in a specified shape as described above to increase the adhesive bonding strength of organic passivation film 78 to the gate insulating film 74.

As shown in the structure of FIG. 8B, holes 56 are formed and spaced from each other with a predetermined distance. The organic passivation film 78 and the gate insulating film 74 are etched to form the holes 56. The holes 56 are formed in a predetermined pattern by exposure, development and etching processes using a photoresist and an exposure mask.

As further shown in the structure of FIG. 8B, the upper substrate 80 includes a color filter and a black matrix 84 formed on the rear surface of the upper glass substrate 82 that faces the upper surface of the lower substrate 72. A transparent common electrode 86 is formed entirely on the color filter and a black matrix 84 formed on the rear surface of the upper glass substrate 82. The lower substrate 70 and the upper substrate 80 are adhered to each other by a sealant coated as a seal pattern 54. The sealant of the seal pattern 54 directly contacts the metal line 73 through the holes 56 formed on the lower substrate and spaced from each other with a predetermined distance.

The adhesive bond between the upper substrate 80 and the lower substrate 70 is greatly improved by the direct contact of the sealant in the seal pattern 54 to the metal line 73. In addition, the contact area of the sealant and the lower substrate 70 is enlarged by the holes 56, which further improve the adhesive bonding capability of the seal pattern 54. To prevent the metal line 73 that is exposed by wet etching from being oxidized during the formation of the holes 56, a pixel electrode material (not shown), that is, an indium-tin-oxide (ITO) layer, can be further formed on the metal line 73. Thus, the sealant of the seal pattern 54 directly contacts the pixel electrode material formed on the lower gate metal 73 through the holes 56 that are formed on the lower substrate and spaced from each other with a predetermined distance.

Figure 9:
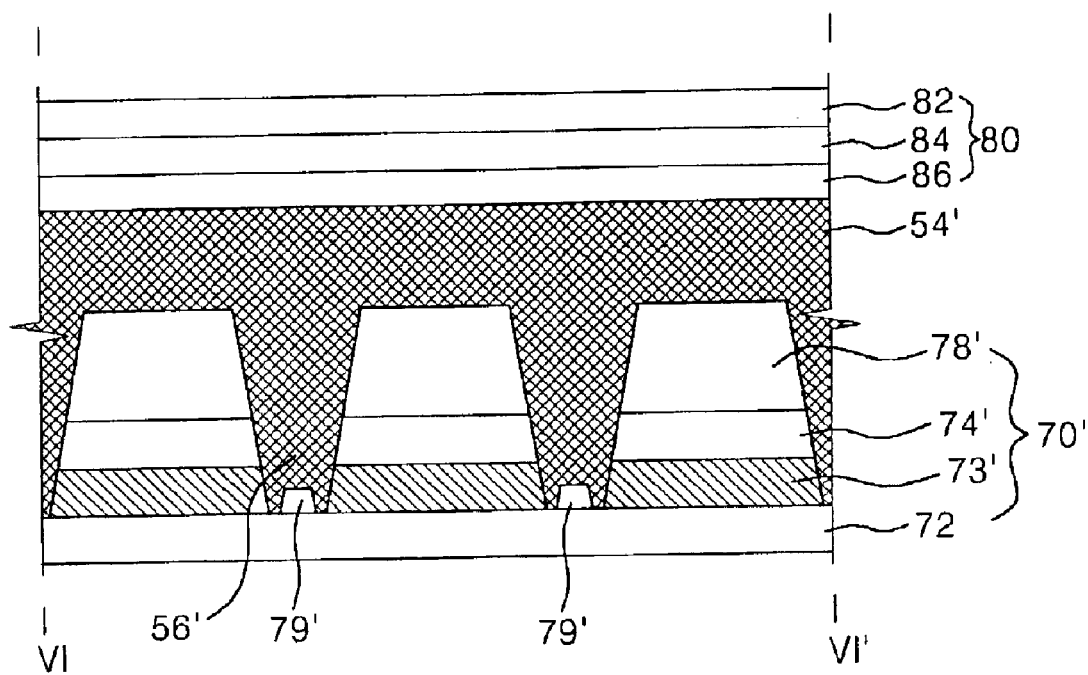
FIG. 9 is a cross-sectional view of a liquid crystal display panel according to another exemplary embodiment of the present invention.

FIG. 9 is a cross-sectional view of a liquid crystal panel according to another exemplary embodiment of the present invention. Since FIG. 9 is with regard to same area as shown in FIG. 8B, the same configuration components are referred to by similar reference numbers. FIG. 9 is a cross-sectional view of the seal pattern 54' crossing over the common line 53. The structure of the seal pattern 54' crossing the common line 53 can be similar to the structure of the seal pattern 54' crossing the dummy line 55. The structure includes a metal line 73' that is the common line 53, a gate insulating film 74' and a semiconductor layer 79' laminated on the glass substrate 72 of the lower substrate. In the case of the dummy line 55, the metal line 73' is the dummy line 55. The structure also includes an organic passivation film 78' coated on the gate insulating film 74' that is on the metal line 73'.

As shown in the structure of FIG. 9, the metal line 73' provided with holes 56' spaced from each other is formed initially. The gate insulating film 74' and the organic passivation film 78' are formed on the metal line 73' except for the holes 56. The semiconductor layer 79' is formed in a specific shape in the holes 56' formed in the metal line 73'. Here, the semiconductor 79' is formed in a specified shape to increase the adhesive bonding capability of the sealant pattern 54' to the lower glass substrate 72. Accordingly, holes 56' are formed in the common line on the lower substrate and spaced from each other with a predetermined interval. The predetermined interval can be in between data lines D along the common line 53 and in between the gate lines G along the dummy line 55.

As further shown in FIG. 9, the upper substrate 80 includes a color filter and a black matrix 84 formed on the rear surface of the upper glass substrate 82 that faces the upper surface of the lower substrate 72. A transparent common electrode 86 is formed entirely on the color filter and a black matrix 84 formed on the rear surface of the upper glass substrate 82. The lower substrate 70' and the upper substrate 80 are adhered to each other by a sealant coated as a seal pattern 54'. The sealant of the seal pattern 54' directly contacts the lower glass substrate 72 and the semiconductor pattern 79' through the holes 56'.

The adhesive bond between the upper substrate 80 and the lower substrate 70' is greatly improved by the direct contact of the sealant in the seal pattern 54' to the metal line 73', the lower glass substrate 72 and the semiconductor pattern 79'. In addition, the contact area of the sealant of the sealant pattern 54' to the lower substrate 70' is enlarged by the holes 56', which improve the adhesive property further. To prevent the metal line 73' that is exposed by wet etching from being oxidized during the formation of the holes 56', a pixel electrode material (not shown), such as an indium-tin-oxide (ITO) layer, can be formed on the metal line 73' prior to the formation of the semiconductor pattern 79'. Thus, the sealant of the seal pattern 54' is directly in contacted with the pixel electrode material formed on the metal line 73' through the holes 56' that are formed on the lower substrate and spaced from each other with a predetermined distance.

As described above, in the liquid crystal display device according to the present invention, the adhesive strength between the upper substrate and the lower substrate is improved and liquid crystal leakage caused by external impact is prevented so that the yield of LCD panels is improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device, comprising:
    a substrate having an image display part;
    a metal line on the substrate;
    an insulating film on the metal line;
    a semiconductor layer on the insulting film;
    a passivation film on the semiconductor layer; and
    a sealant pattern of sealant having a path formed along the periphery of the image display part, wherein the insulating film and the passivation layer have a plurality of holes along the path of the sealant pattern,
    wherein the semiconductor layer increases the adhesive bond between the insulating film and the passivation film.

2. The liquid crystal display device according to claim 1, further comprising:
    data links on a first side of the image display part;
    gate links on a second side of the image display part;
    a common line on a side of the image display part opposite to the first side; and
    a dummy line on a side of the image display part opposite to the second side, wherein the sealant pattern contacts the substrate through holes on the first side and the second side.

3. The liquid crystal display device according to claim 2, wherein the sealant pattern contacts the substrate through holes on the first side, the second side and the side of the image display part opposite to the first side.

4. The liquid crystal display device according to claim 2, wherein the sealant pattern contacts the substrate through holes on the first side, the second side and the side of the image display part opposite to the second side.

5. The liquid crystal display device according to claim 2, wherein the sealant pattern contacts the metal line through holes on the side of the image display part opposite to the first side and the side of the image display part opposite to the second side.

6. The liquid crystal display device according to claim 2, further comprising an indium tin oxide on the metal line, wherein the sealant pattern contacts the indium tin oxide through holes on the side of the image display part opposite to the first side and the side of the image display part opposite to the second side.

7. The liquid crystal display device according to claim 1, wherein the passivation film is an organic insulator.

8. The liquid crystal display device according to claim 1, wherein the semiconductor layer is formed on the insulating film.

9. The liquid crystal display device according to claim 1, wherein the semiconductor layer has a specified shape and is formed on the insulating film between holes.

10. The liquid crystal display device according to claim 9, wherein a plurality of semiconductor layers is formed amongst the holes and along a side of the image display part opposite to the first side.

11. The liquid crystal display device according to claim 9, wherein a plurality of semiconductor layers is formed amongst the holes and along a side of the image display part opposite to the second side.

12. A liquid crystal display device, comprising:
    a substrate having an image display part;
    a metal line on the substrate;
    an insulating film on the metal line;
    a passivation film on the insulating film;
    a sealant pattern of sealant having a path formed along the periphery of the image display part, wherein the insulating film and the passivation layer have a plurality of holes along the path of the sealant pattern; and
    semiconductor layers for increasing the adhesive bond between the sealant and the substrate.

13. The liquid crystal display device according to claim 12, further comprising:
    data links on a first side of the image display part;
    gate links on a second side of the image display part;
    a common line on a side of the image display part opposite to the first side; and
    a dummy line on a side of the image display part opposite to the second side, wherein the sealant pattern contacts the substrate through holes on the first side and the second side.

14. The liquid crystal display device according to claim 13, wherein the sealant pattern contacts both the semiconductor layers and the substrate through holes on the first side, the second side and the side of the image display part opposite to the first side.

15. The liquid crystal display device according to claim 13, wherein the sealant pattern contacts both the semiconductor layers and the substrate through holes on the first side, the second side and the side of the image display part opposite to the second side.

16. The liquid crystal display device according to claim 12, wherein the passivation film is an organic insulator.

17. The liquid crystal display device according to claim 12, wherein the semiconductor layers are formed on the substrate.

18. The liquid crystal display device according to claim 13, wherein each of the semiconductor layers have a specified shape and are formed on the substrate in the holes along a side of the image display part opposite to the first side.

19. The liquid crystal display device according to claim 13, wherein each of the semiconductor layers have a specified shape and are formed on the substrate in the holes along a side of the image display part opposite to the second side.

* * * * *